(12) United States Patent
Pryor

(10) Patent No.: US 7,804,530 B2
(45) Date of Patent: *Sep. 28, 2010

(54) PICTURE TAKING METHOD AND APPARATUS

(76) Inventor: Timothy R. Pryor, 416 Old Tecumseh Road, Tecumsch, Ontario (CA) N8N 3S8

( * ) Notice: Subject to any disclaimer, the term of this patent is extended or adjusted under 35 U.S.C. 154(b) by 1108 days.

This patent is subject to a terminal disclaimer.

(21) Appl. No.: 11/376,158

(22) Filed: Mar. 16, 2006

(65) Prior Publication Data

US 2006/0158522 A1 Jul. 20, 2006

Related U.S. Application Data

(63) Continuation of application No. 09/568,552, filed on May 11, 2000, now Pat. No. 7,015,950.

(60) Provisional application No. 60/133,671, filed on May 11, 1999.

(51) Int. Cl.
*H04N 5/225* (2006.01)

(52) U.S. Cl. .................................. 348/239; 348/222.1
(58) Field of Classification Search ............ 348/222.1, 348/239; 345/158, 8
See application file for complete search history.

(56) References Cited

U.S. PATENT DOCUMENTS 4,988,981 A * 1/1991 Zimmerman et al. ........ 345/158
6,346,929 B1 * 2/2002 Fukushima et al. ............ 345/8

* cited by examiner

*Primary Examiner*—Tuan Ho
(74) *Attorney, Agent, or Firm*—Stites & Harbison PLLC; Douglas E. Jackson

(57) ABSTRACT

Method and apparatus is disclosed to enhance the quality and usefulness of picture taking and other image acquisition for pleasure or business purposes. In a preferred embodiment, stereo photogrammetry is combined with digital image acquisition to acquire or store scenes and poses of interest, and/or to interact with the subject in order to provide data to or from a computer. This data may be utilized to maximize the effectiveness of photographic sessions, particularly digital still photography or cine-photography. A further embodiment discloses associated displays and teaching apparatus.

23 Claims, 7 Drawing Sheets

PICTURE TAKING METHOD AND APPARATUS

CROSS REFERENCE TO RELATED APPLICATIONS

This application is a continuation of application Ser. No. 09/568,552, filed May 11, 2000, now U.S. Pat. No. 7,015,950 issued Mar. 21, 2006 (which is hereby incorporated by reference); which claims benefit of U.S. Provisional Application No. 60/133,671 filed May 11, 1999 (which is hereby incorporated by reference).

REFERENCES TO RELATED APPLICATIONS BY THE INVENTOR

This application is a related application of application Ser. No. 09/435,854 filed Nov. 8, 1999, which was a continuation of application Ser. No. 08/496,908 filed Jun. 29, 1995, now U.S. Pat. No. 5,982,352, which was a continuation-in-part of application Ser. No. 08/290,516, filed Aug. 15, 1994, now U.S. Pat. No. 6,008,000, which was a continuation of application Ser. No. 07/946,588, filed Sep. 18, 1992, now abandoned.

This application is also a related application of co-pending applications Ser. No. 09/138,339 filed Aug. 21, 1998 and Provisional Patent application No. 60/142,777 filed Jul. 8, 1999.

The disclosures of the following U.S. patents and co-pending patent applications by the inventor, or the inventor and his colleagues, are incorporated herein by reference:

1. U.S. Pat. No. 4,629,319 (Panel Surface Flaw inspection, which discloses a novel optical principle commonly called "D Sight"), and U.S. Pat. Nos. 5,362,970 5,880, 459, 5,877,491, 5,734,172, and 5,670,787.
2. U.S. application Ser. No. 09/435,854 and U.S. Pat. No. 5,982,352, and U.S. Ser. No. 08/290,516 ("Man Machine Interfaces"), filed Aug. 15, 1994, now U.S. Pat. No. 6,008,000, the disclosure of both of which is contained in that of Ser. No. 09/435,854.
3. U.S. application Ser. No. 09/138,339, Useful man machine interfaces and applications.
4. U.S. application Ser. No. 09/433,297, More useful man machine interfaces and applications.

Provisional Patent Applications

6. Camera Based Applications of Man-Machine Interfaces U.S. Ser. No. 60/142,777.
7. Methods and Apparatus for Man Machine Interfaces and Related Activity, Ser. No. 60/133,673.
8. Tactile Touch Screens for Automobile Dashboards, Interiors and Other Applications, Ser. No. 60/183,807, filed Feb. 22, 2000.
9. Apparel Manufacture and Distance Fashion Shopping in Both Present and Future, Ser. No. 60/187,397, filed Mar. 7, 2000.
10. Weight Loss and Fashion Shopping, by Marie C. Pryor and Timothy R. Pryor, Ser. No. 60/187396, filed Mar. 7, 2000.

The disclosures of the above referenced applications are incorporated herein by reference.

FEDERALLY SPONSORED R AND D STATEMENT not applicable

MICROFICHE APPENDIX not applicable

INTRODUCTION

Method and apparatus is disclosed to enhance the quality and usefulness of picture taking for pleasure, commercial, or other business purposes. In a preferred embodiment, stereo photogrammetry is combined with digital image acquisition to acquire or store scenes and poses of interest, and/or to interact with the subject in order to provide data to or from a computer. Other preferred embodiments illustrate applications to control of display systems.

BACKGROUND

Representative of USA Patents on Digital cameras are U.S. Pat. Nos. 5,534,921, 5,249,053 and many others which describe use of matrix array (CCD or otherwise) based cameras to take pictures of humans or other objects. The images taken are generally comprised of 400,000 or more pixels which are often compressed to smaller record sizes for data storage, for later retrieval and display. Video cameras or Camcorders are also increasingly able to take still photographs as well, and record or transmit them to computers.

Aside from exposure control (to keep the light reaching the detector array within the dynamic range of same), and range finding (to effect the best lens focus given the object distance in question) there are few cases known to the inventor where the camera taking the picture, actually determines some variable in the picture and uses it for the process of obtaining the picture.

One such example that does not take a picture of humans but rather of data, is exemplified by U.S. Pat. No. 4,791,589, where a certain wave form signature on an oscilloscope is searched for by processing the digital camera image, and when it is seen, the image stored.

More apropos the function of "Picture Taking" as the general public knows it and of interest as the primary focus of the instant invention, is U.S. Pat. No. 5,781,650 by Lobo, et al which describes analysis after the fact of recorded images to determine facial content and thus the age of the subject. This disclosure also alludes to a potential point and shoot capability also based on the age classification of the individuals whose picture is desired.

There is no known picture taking reference based on object position and orientation with respect to the camera, or other objects that I am aware of.

SUMMARY OF THE INVENTION

High Resolution Digital still cameras employing matrix photodetector array chips to scan the image produced by the camera lens are now commonplace, and will be even more so in a few years as chips and memories become very inexpensive, and pixel density approaches 2000×2000 pixels, rivaling photographic film. Even today Camcorders having 700×500 pixel image chips are common for video based data and stills.

This invention is aimed at improvements in utilization of these cameras and others which make use of a computer based camera's ability to analyze, in real time if desired, the images obtained. Indeed a picture taking system may be composed of a combination of cameras, some used for purposes other than the recording of the picture proper.

It is a goal of the invention to provide a method for taking pictures when certain poses of objects, sequences of poses, motions of objects, or any other states or relationships of objects are represented. It is also a goal to allow this to be done in a self timer like mode, when desired scene situations or specific dates or other circumstances exist. In some cases, information as to what is desired may be entered remotely, even over the internet, or radio telephone.

It is also a goal of the invention to provide a method for selecting from a digital or other picture memory, pictures obtained when certain pre programmed poses of objects, sequences of poses, or relationships of objects are represented.

It is a further goal of the invention to provide means by which users engaged in digital camera based activities, or other activities, using a computer can have their pictures taken.

It is a still further goal to provide all such functions in a 2D or 3D context, and using simple equipment capable of widespread use.

It is another goal of the invention to feed back data to a subject or subjects having his or her, or their picture taken, in order that they assume another pose or engage in another activity, or juxtaposition of subject positions.

While this invention is primarily aimed at the general picture taking public at large, it is realized that commercial photographers and cine-photographers, for example in the coming trend to digital "Hollywood" movie making, may benefit greatly from the invention herein, as it potentially allows more cost effective film production by giving the director the ability to expose the camera to the presence of masses of data—but only saving or taking that data which is useful, and if desired, to signal the creation of further data based on data obtained. All this with little or no human intervention as desired, thus saving on the cost of direction, film crews, and other labor or venue related costs.

DRAWINGS DEPICTING PREFERRED EMBODIMENTS OF THE INVENTION

EMBODIMENTS OF THE INVENTION

FIG. 1

Figure 1:
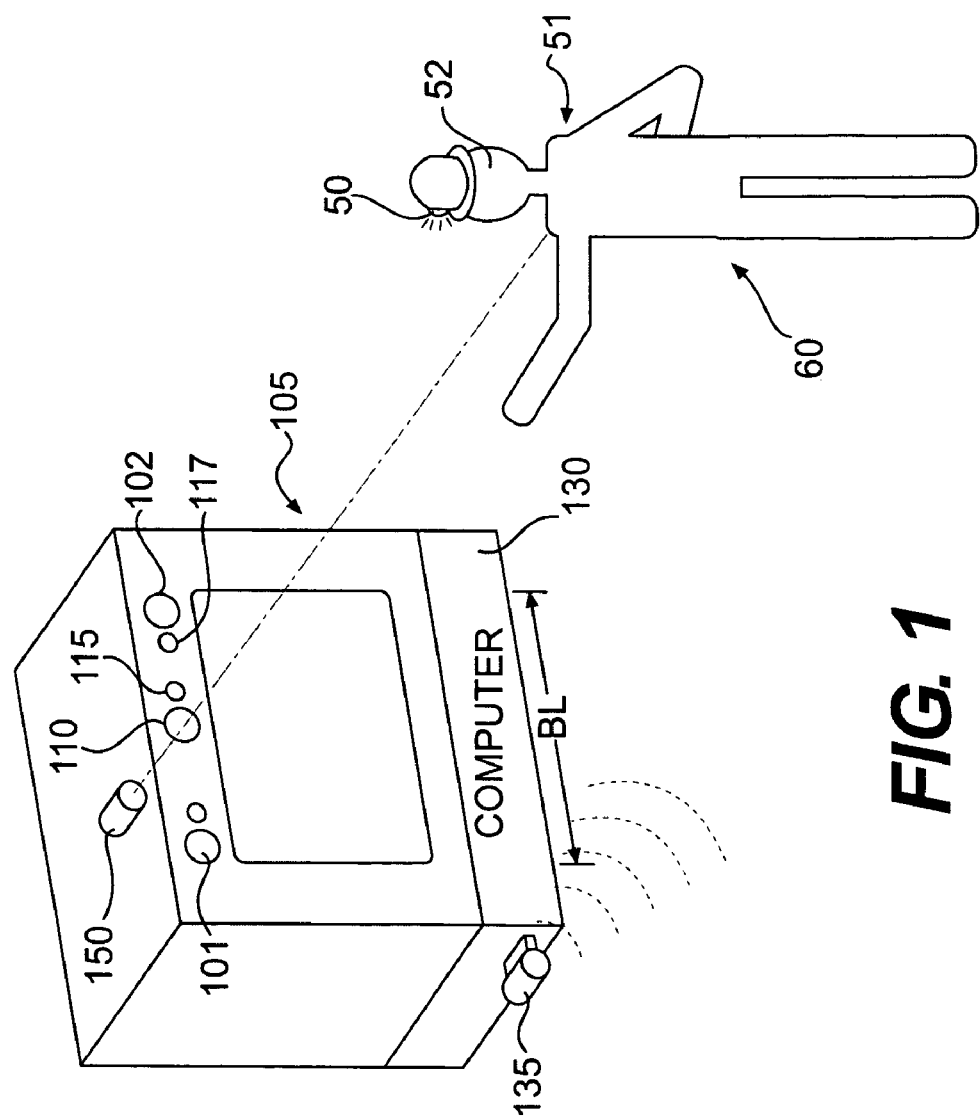
FIG. 1 illustrates means by which users engaged in digital camera based activities, or other activities, using a computer can have their pictures taken.

Illustrated in FIG. 1 of the invention is means by which users engaged in digital camera based activities, or other activities, using a computer can have their pictures taken, and in this context, FIG. 1 resembles that of co-pending referenced application 9 above. A single camera, or a set, such as a stereo pair are employed to see portions of an object, such as a person, a part of a person such as a hand, leg, foot, fingers, or head, and/or to view datums on an object, portion of an object, or an object held by the person or with which the person interacts. In addition, multiple persons and objects can be seen.

Where a single camera is employed, 2D measurements of object location relative to the camera (x and y perpendicular to the camera axis) are all that is possible, unless datums of known shape or spacing are used on the object viewed. Where a stereo pair or more of cameras are employed, 3D (xyz) data of a single point can be provided, for example retro-reflector 50 on the head 52 of person 51. In both cases where 3 or more datums are used on an object, 6 Degree of freedom data can be obtained, allowing object orientation in 3 angular axes as well as range in 3 axes to be obtained. With two or more cameras, such 3D data may also be obtained using other features of objects such as edges of arms and the likely using known photogrammetric techniques.

The cameras used may also be used to take pictures of an object, or another specialized camera used for that purpose in conjunction with those used to determine the location of object features. Both examples are illustrated in this application.

As shown in this figure, two cameras 101 and 102 are used as a stereo pair, with each camera located at opposite sides of a TV monitor 105, used for either computer or Television display or both. This is a desirable configuration commercially and discussed the co-pending application references above. In this particular case, an additional camera 110 is shown in the middle of the other two, said added camera used for picture taking, internet telephony and/or other purposes. An optional auxiliary LED light source 115 (or 116 or 117) for illuminating a user 60 or other object is also shown.

All three cameras are connected to the computer 130 by means of a USB (Universal Serial Bus) daisy chain, or IEEE 1394 firewire connections (faster). Each is accessed, as needed for position and orientation determination, or picture taking.

Even using a single camera in two dimensions (as is normal today), some position and orientation data or sequences of same can be achieved using modern image processing techniques. (See for example the invention disclosed in U.S. Pat. No. 4,843,568 of Myron Krueger). However, accurate sensing and control of systems, such as cameras herein is difficult today with processors cost effective enough to be used by the public at large, and artificial target augmentation of image points is often desirable.

It is thus possible using the invention to be taking pictures of users of interactive computer systems for whatever purpose. This allows one to automatically capture images of children at play, for example with a computer system such as a computer game. It also enables many other functions which are described below. And it can be used in the field, where the computer, stereo position sensing and picture taking camera, may be co-located together in the same housing.

It is noted that where retro-reflectors are used,( as opposed to choosing for example less contrasting datums, for example natural object features such as edges of fingers, or clothing features, or targets such as colored dots) then each of the two cameras for stereo location determination needs lights to illuminate retro-reflectors substantially co-located with the camera axes. These lights can alternatively provide general lighting for any other camera or cameras to use in taking photographs or other purposes.

It is noted that cameras 101 and 102 need not have the image of the retro-reflector or other discernable target be in precise focus, in deed it is often helpful to have a some blur due to defocusing so as to aid sub pixel position solution of datum location. If the LEDs or other light sources are in the near infrared, and the camera lenses are focused in the visible, this occurs naturally, unless the lens is also near infrared chromatic corrected.

An optional laser pointer (or other suitable illumination source), comprised of diode laser and collimating optics 150 is also usable with the invention to illuminate object portions from which 3D data is desired (such as the neck region of person 51 as shown), or in the simpler case to designate which areas of a picture are to be focused, or zoomed in on or transmitted or recorded—with or without consideration of 3-D position data of the object. This can be fixed as shown, or optionally hand held by the user, for example in left hand (dotted lines) and used by him or her to designate the point to be measured in 3D location. (see also references above). In addition a person taking pictures, such as a photography can without looking through the viewfinder of the camera, point to appoint on the subject, which is then dealt with by camera typically by focusing the lens system such that the point is in the desired state of focus (usually but not necessarily when the laser spot on the subject appears smallest in diameter and/ or of highest contrast). Such as system is particularly useful for cameras with wide fields of view, or those mounted on pan tilt mechanisms, where the mechanism can also be activated to position the camera axis to take the picture with the laser spot for example centered in the camera field.

In the laser designated case, it is generally the laser spot or other indication on the surface that is imaged, (although one can also instruct, for example using voice recognition software in computer 130 inputted via voice activated microphone 135, the camera processor to obtain and store if desired the image of the area around the spot projected onto the object as well or alternatively), and if the spot is desired, it is often useful that cameras 101 and 102 have band-pass filters which pass the laser wavelength, and any led illumination wavelengths used for retro-reflector illumination for example, but block other wavelengths to the extent possible at low cost. It is noted that the discrimination in an image can also be made on color grounds—i.e. with red diode lasers and red LEDs, the system can analyze the image areas containing reds in the image, for example—with the knowledge that the answer cant lie at any shorter wavelengths (e.g. green, yellow, blue).

By using two cameras 101 and 102, a superior ranging system for the laser spot location on the subject results, since the baseline distance "BL" separating the cameras for triangulation based ranging purposes can be sufficient to provide accurate measurement of distance to the object.

FIG. 2

As we begin to consider the apparatus of FIG. 1, it is clear one could do much more to enhance picture taking ability than hereto fore described and contained in the prior art. And it can be done with apparatus capable of field use.

FIG. 2 for example, illustrates a method for taking pictures when certain pre programmed or otherwise desired poses of objects, sequences of poses, or relationships of objects are represented. No such ability is available to photographers today.

Consider still camera system 201, patterned after that of FIG. 1 and comprising 3 cameras and associated image scanning chips. The central camera, 202 is for picture taking and has high resolution and color accuracy. The two cameras on either side, 210 and 211, may be lower resolution (allowing lower cost, and higher frame rate, as they have less pixels to scan in a given frame time), with little or no accurate color capability, as they are used to simply see object positions or special datum positions on objects (which may be distinguished however by taught colors for example as taught in some of my co-pending inventions).

Cost wise the distinction between cameras is important. Today low cost CMOS chips and lenses capable of the providing stereo measurements as described above are $15 or less. High quality CCD color detector arrays and lenses for high quality photo images are over $100—and in many cases $1000 or more.

An optical viewfinder 215 is one of many ways to indicate to the user what scene information is being gathered by the camera system. The user can in this invention specify with a viewfinder based readout, the area of the field that is desired. Use of the viewfinder in this manner, whether looked through or displayed on a screen, is for example an alternative to designating an area on the actual object using a laser pointer for the purpose.

The camera system 201 further contains a computer 220 which processes the data from cameras 210 and 211 to get various position and/or orientation data concerning a person (or other object, or persons plural, etc). Integral light sources as described in FIG. 1 above may also be provided such as LED arrays 240 and 245 and xenon flash 246.

In general, one can use the system to automatically "shoot" pictures for example, when any or all of the following occur, as determined by the position and orientation determining system of the camera of the invention:

1. Subject in a certain pose.
2. Subject in a sequence of poses.
3. Portion of Subject in a sequence of poses (e.g. gestures,).
4. Subject or portion(s) in a specific location or orientation.
5. Subject in position relative to another object or person. For example, this could be bride and groom kissing in a wedding, boy with respect to cake on birthday, and sports events sequences of every description (where the camera can even track the object datums in the field and if desired adjust shutter speed based on relative velocity of camera to subject).
6. Ditto all of above with respect to both persons in certain poses or gesture situations.
7. When a subject undertakes a particular signal comprising a position or gesture—i.e. a silent command to take the picture. (this could be programmed, for example to correspond to raising ones right hand).

In addition it is noted that the invention acts as a rangefinder, finding range to the subject, and even to other subjects around the subject, or to all parts of interest on an extensive subject. This allows a desired lens focus to be set based on any or all of this data, as desired. It also allows a sequence of pictures to be taken of different object or object portions, at different focal depths, or focus positions. The same holds true for exposure of these locations as well.

It is also possible to use the above criteria for other purposes, such as determining what to record, (beyond the recording that is implicit in taking pictures), or in determining what to transmit. The latter is important vis a vis internet activity, where available internet communication bandwidth limits what can be transmitted (at least today). In this case video telephony with the invention comprehends obtaining only those images you really care about in real time. So instead of transmitting low resolution image data at 20 frames a second, you can transmit say 5 (albeit asynchronously gathered) frames of high resolution preferred data. (This doesn't solve flicker problems, but it does mean that poor quality or extraneous material isn't sent!). Criteria such as degree of image motion blur or image focus can also be used in making transmission decisions.

Figure 2A:
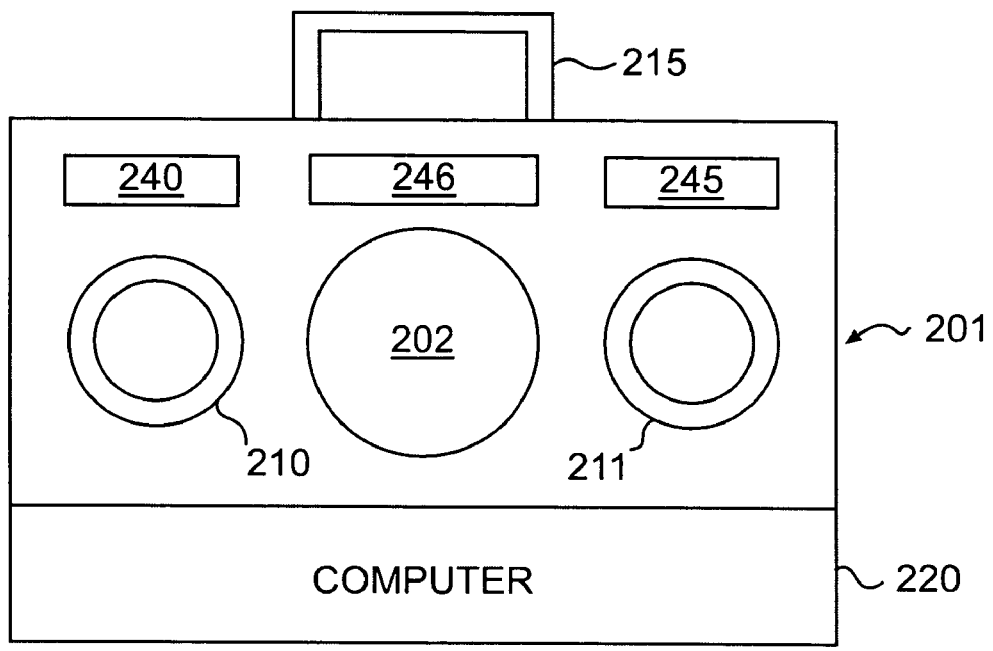
FIG. 2 illustrates a method for taking pictures when certain pre programmed poses of objects, sequences of poses, or relationships of objects are represented.
Figure 2D:
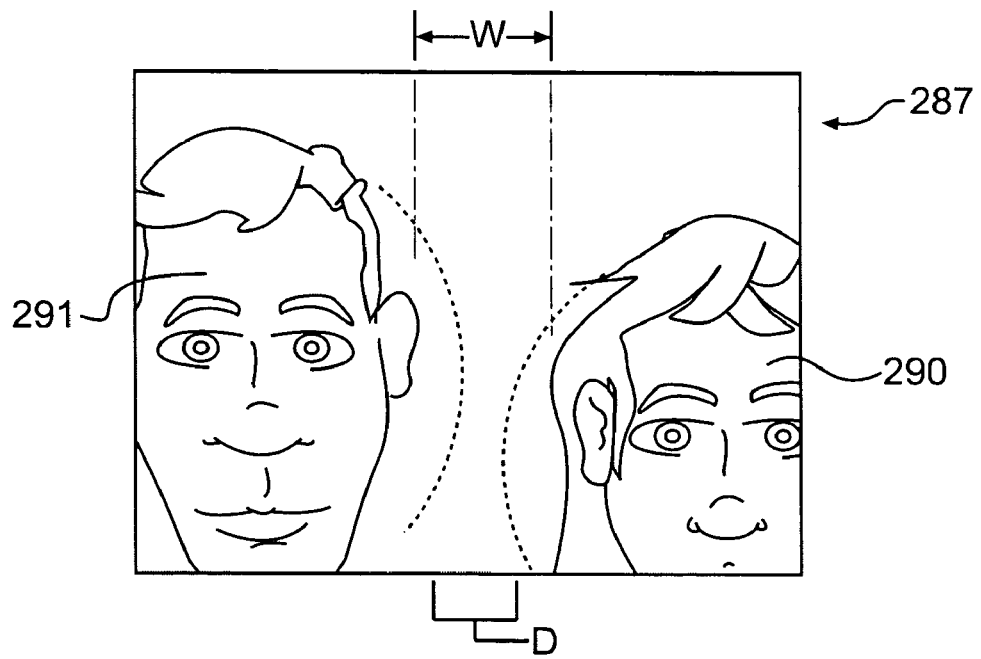
Figure 2B:
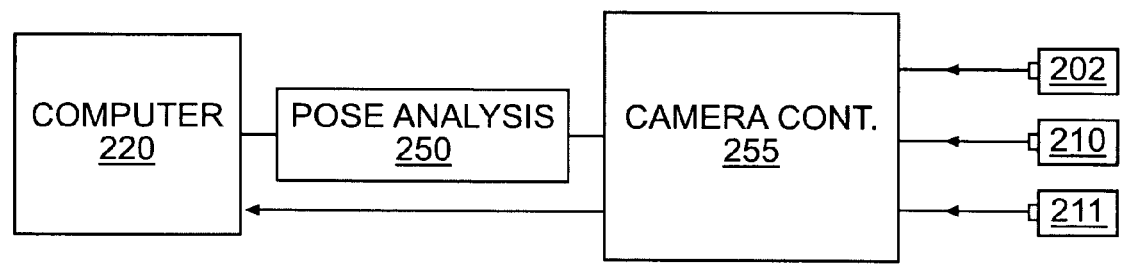

FIG. 2b illustrates a block diagram showing a pose analysis software or hardware module 250 analyzing processed image data (for example utilizing camera image data processed by visionbloks software from Integral Vision Corp.) from the computer 220 (which may be the same physical microprocessor, such as a Intel Pentium 2 in a Dell inspiron 3500 laptop computer, or different) and determining from same when a certain pose for example has been seen. When this occurs, a signal is sent to the camera control module 255 to hold the last frame taken by camera 202, and to display it to the photographer, digitally store it, or transmit it—to someone else, or another data store or display. Such transmission can be by data link, internet, cell phone, or any other suitable means.

Another criteria could be that two or more preselected poses were seen one after the other, with a time delay between them, also pre-selected if desired.

Figure 2C:
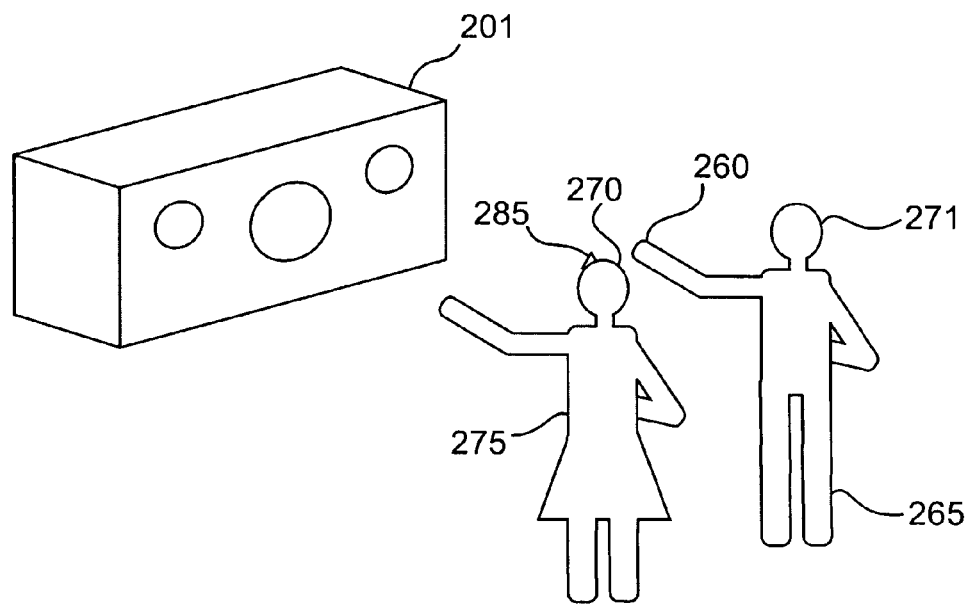

FIG. 2C illustrates a specific case whereby a point on one person, say hand 260 of man 265 having head 271, is determined, and a picture is taken by camera system 201 of the invention when this point comes within a distance of approximately 6 inches (or any other desired amount including contact—i.e. zero distance) from another person or object, say the head 270 of woman 275. To obtain the data, one can look for hand or head indications in the image using known machine vision techniques, and/or in a more simple case put a target marker such as colored triangle 285 or other type on the hand or head or both and look for it.

The use of the natural features of the subjects heads, which are distinguishable by shape and size in a known field containing two persons, is now illustrated. For example, image morphology or template matching in the image field of the solid state TV camera 202 can be used to distinguish the head shapes from background data and data concerning the rest of the features such as hands etc of subjects 265 and 275 (or conversely hand shapes if desired can be found and heads excluded, or the hand of the right person, versus the head of the left, and so forth).

As shown in FIG. 2D, when the image field 287 of camera 202 after processing contains the two head images, 290 and 291, spaced a distance "W". When W is not within a tolerance D, the picture is not taken, whereas if the heads are close enough, within D as illustrated in dotted lines, the picture is taken.

Criteria as mentioned can include proximity of other parts of the body, or objects associated with the subjects (which themselves can be objects). In addition, the motion or relative motion of objects can be the criteria. For example, one could take program the device to take the picture when on two successive frames the condition shown in FIG. 2D exists where the heads are apart in frame 1, but closer in frame 2 (probably corresponding to a movement say of the boy to kiss the girl). Clearly other sequences are possible as well, such as movement taking place in several frames followed by a sequence of frames in which no movement occurs. Other means to determine motion in front of the camera can also be used in this context, such as ultrasonic sensors.

It is also noted that the actual position or movement desired can be "Taught" to the computer 220 of the picture taking system. For example, a boy and girl in a wedding could approach each other and kiss beforehand. The sequence of frames of this activity (a "gesture" of sorts by both parties) is recorded, and the speed of approach, the head positions and any other pertinent data determined. When the photographer thinks the picture is right, the computer of the camera system is instructed to take the picture—for example it could be at the instant when after a suitable approach, two head images become joined into one—easily recognizable with machine vision processing software under uniform background conditions. Then in the future, when such a condition is reached in the camera field of view, pictures are taken and stored, or transmitted. This allows a camera to free run whose image field for example takes in the head table at a wedding party, taking only the shots thought to be of most interest. Numerous conditions might be programmed in, or taught in—another at the same party, would be anyone at the head table proposing a toast to the bride and groom, with arm and glass raised. If video is taken, it might be taken from the point at which the arm rises, until after it comes down. Or with suitable voice recognition, when certain toast type words are heard, for example.

Application to "3-D" Pictures

Where it is desired to take "3-D" pictures, it can be appreciated that each camera, 210 and 211 can take images of the scene in place of camera 202, and that both camera's 210 and 211 outputs can be stored for later presentation in a 3D viewing context, using known display techniques with appropriate polarized glasses or switchable LCD goggles for example. In this case the camera outputs can serve double duty if desired, each both recording picture data, as well as determining position of one or more points on the object or objects desired.

In addition, or alternatively, one can use in this 3D picture case, the camera 202 (or even a stereo camera pair in place of 202) as a means for determining position and orientation independently from the stereo picture taking cameras.

If not used for immediate position information, camera 202 does not have to be digital and could employ film or other media to record information.

FIG. 3

In a manner resembling that of FIG. 2 above, the invention can also serve to aid a person to take his or her own picture—a modern "Self timer" if you will. For example any or all of the criteria such as the items 1-7 above, can be used as criteria for the picture to be taken of oneself. This is in addition to other more normal things like taking pictures after a certain time, or on a certain date or time interval etc. This has particular appeal for taking pictures of ones self, or in any other situation where the photographer is not present (e.g. unattended recording of animals, children etc). Similarly, a hand signal or other signal to the camera can be used to trigger the picture to be taken, using the computer camera combination to determine the hand position or movement. This can also be done by voice using microphone input and suitable voice recognition software in the computer.

Today, in a conventional context, one can as a photographer, chose to shoot a fashion model or other subject, and when you see a pose you like record the picture. But as ones own photographer, this is much more difficult, unless you stream in video and search through the poses after the fact.

But even then, you don't know that the poses were what was desired, as no feedback exists during the shoot.

With the invention, you may program the system to take only those poses which you think you want to get. And it can instruct the subject, when a picture is taken (and the lack thereof indicating to do something different to obtain the desired effect resulting in a picture). The effect desired can be changed in midstream to adjust for changing wants as well, by changing the program of the computer (which could be done using hardware switches, inserting a disc, or otherwise entered as a command). In addition, as mentioned above, the gesture or pose desired, can be taught to the system, by first photographing a variety of acceptable positions or sequences, and putting bounds on how close to these will be accepted for photographing.

Figure 3:
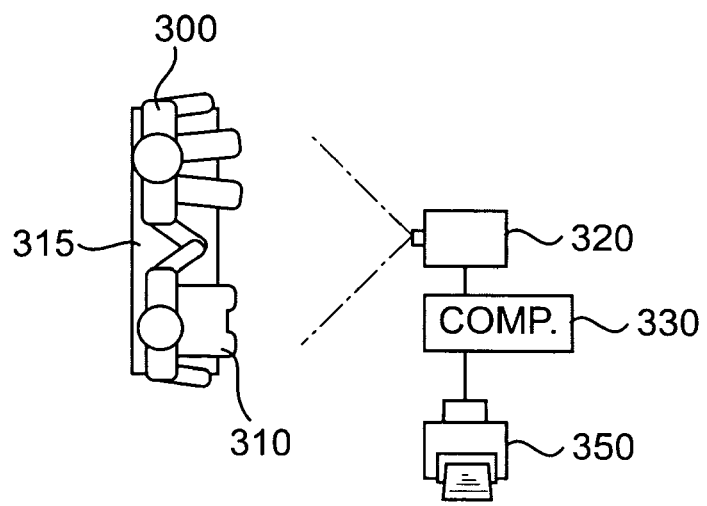
FIG. 3 illustrates a self timer like mode, or when specific dates or other circumstances exist, including a system embodiment for taking pictures in shopping malls or other locales and providing instant print or other hardcopy capability (e.g. On a tee shirt).

A specialized case is shown in FIG. 3, for self taking instant picture or printout device for use in a shopping mall Kiosk or other venue. In this case two sweethearts 300 and 310 are on a bench 315 in front of the digital or other camera 320. When the computer 330 detects from processing the image (or images) of the invention that their faces are in close proximity (for example using the centroid of mass of their head as the position indicator, or even facial features such as described in the Lobo et al patent reference, the computer then instructs the camera to record the picture. A push button or other selector on the device allows the subjects to select what criteria they want—for example when their heads are together for 5 seconds or more, or not together, or hands held, or whatever. Or when their faces are within a certain distance criteria, such as one inch.

Alternatively, camera 320 may be a video camera and recorder which streams in hundreds or even thousands of frames of image data, and the selection of a group is made automatically by the invention in rapid fashion afterwards, with the subjects selecting their prints from the pre-selected (or taught as above) images as desired. Or the machine itself can make the final selection from the group, sort of as a random slot machine for pictures so to speak, and print the picture using inkjet printer 350 for example. Such a situation could be provided at less cost for example, with an incentive to add in your own criteria for an extra cost, and get pictures to choose from more along the lines desired. Note that in addition to, or instead of prints, they could have magnetic or other machine readable media to take home too.

FIG. 4

Figure 4:
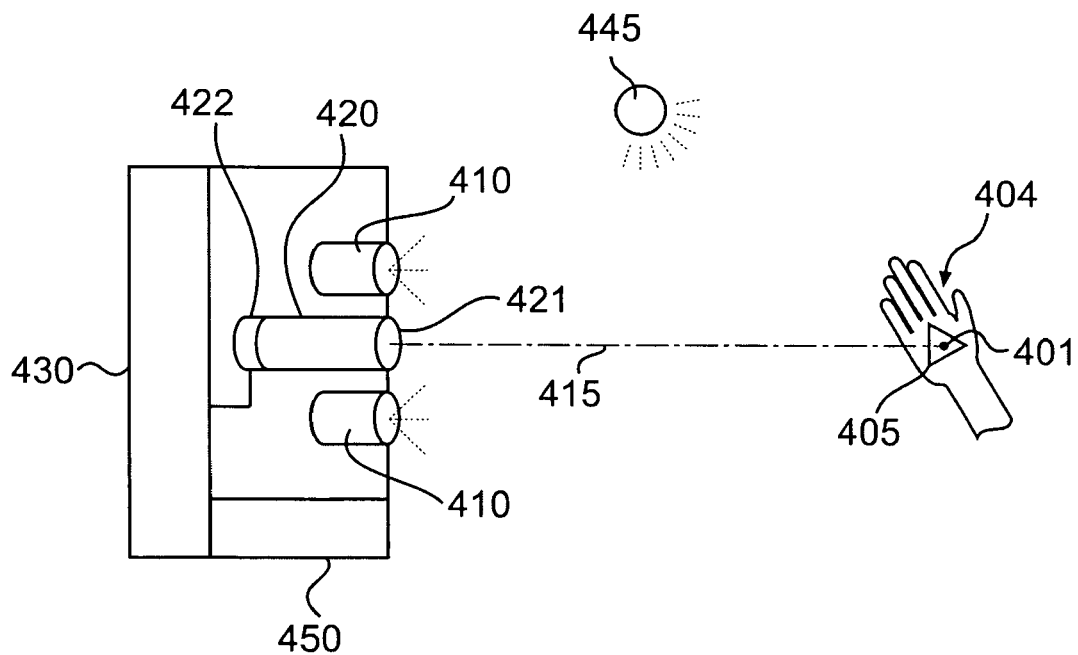
FIG. 4 illustrates means to provide all such functions in a 2D or 3D context, using simple equipment capable of widespread use. Various retroreflective artificial target configurations are also disclosed.

FIG. 4 illustrates means to provide all such functions in a 2D or 3D context, using simple equipment capable of widespread use.

For example, the simplest case is to use the same single camera such as 110, to both take the picture, and to determine location, according to the invention, of one or more points on the object or objects for purposes of controlling the picture taking, recording, or transmission process in some way.

As has been disclosed in the aforementioned referenced co-pending applications, one can view using the single camera, one or more such points in two dimensions, or in three dimensions under certain conditions when spaced points on the object have known spacing between them on the surface of the object.

Identifying points from raw images is processing intensive, as is determination movement gestures of such images, such as an image of an arm or hand in a varying clothing and background situations. But determining the location or movement of one or more artificial targets such as a colored retro-reflector is easy, accurate and fast, based on brightness (under substantially coaxial illumination) and color.—and possibly shape as well if the target is of some distinguishable shape.

For example, consider retro-reflector (e.g. glass bead Scotchlight 7615 tape by 3M company) 401, on the hand of a subject 404, the retro-reflector having a red reflection filter 405 matched to the wavelength of the LEDs 410 used with (and angularly positioned on or near the axis 415 of) camera 420 comprising lens 421 and detector array 422 used to take the picture of the object desired. When it is desired to determine the position of the hand 404, the red LED's are turned on by camera controller 430, and a bright reflection is seen in the image at the point in question due to the retro-reflection effect.

Where stereo pairs of cameras are used, as in FIG. 1 or 2, two reflections are seen whose disparity in location from one camera to the other gives the z distance (range direction) from the camera. In this case light sources are located with each camera of the stereo pair in order that for each camera, the retro-reflectors are properly illuminated with light emanating from point or points angularly near the camera in question.

The LEDs can be illuminated on alternate camera frames, or at any other time when "picture" type image data is not desired. In this case the camera does not under room lights 445 say, normally see the retro-reflection signal, which is desirable as the bright spot of 401 from the image of the human desired. Processor 450 processing the data, can even be used to subtract out from the recorded image, the shape of the retro-reflector, which might be a noticeably different shape than found in practice (e.g. a triangle). The image can be filled in where the subtraction occurred with color, brightness, contrast and texture or other characteristics of the surroundings. This is particularly easy if the target (retro-reflector or otherwise) is placed on the human or object in a region of small variation in characteristics needed to be filled in. E.g. the back of ones hand, say. The key is that after processing, the image look like it did with out addition of the artificial target.

If the LEDs are turned on by the camera controller during picture taking, color processing can be used to remove from the stored image of the scene, any indications of bright zones at the LED wavelength used, filling in with color of the surrounding area as desired.

Clearly both processing techniques just described or others can be used. And the methods work well with stereo pairs of cameras too.

Retro-reflective or other distinguishable artificial targets can be provided in different decorative designs for wrist, back of hand, rings, forehead, hats etc. For example, 3 targets in a heart or triangle shape, a square box of 4 targets, or a box or pyramid with line targets on its edges, and so forth.

Colored targets can be made of cloth, plastic, or the like, including Colored plaids, polka dots, etc. Or coatings or Filters or evaporated on filters may be placed in front of a target such as a plastic retroreflector in order to render it of a given color (if it wasn't made of colored material in the first place).

Decorative line outlines (also possible in retroreflective bead material ) can also be used as target datums, for example down the seam of glove fingers, or shoes, or belts, dress beading, etc.

FIG. 5

Figure 5:
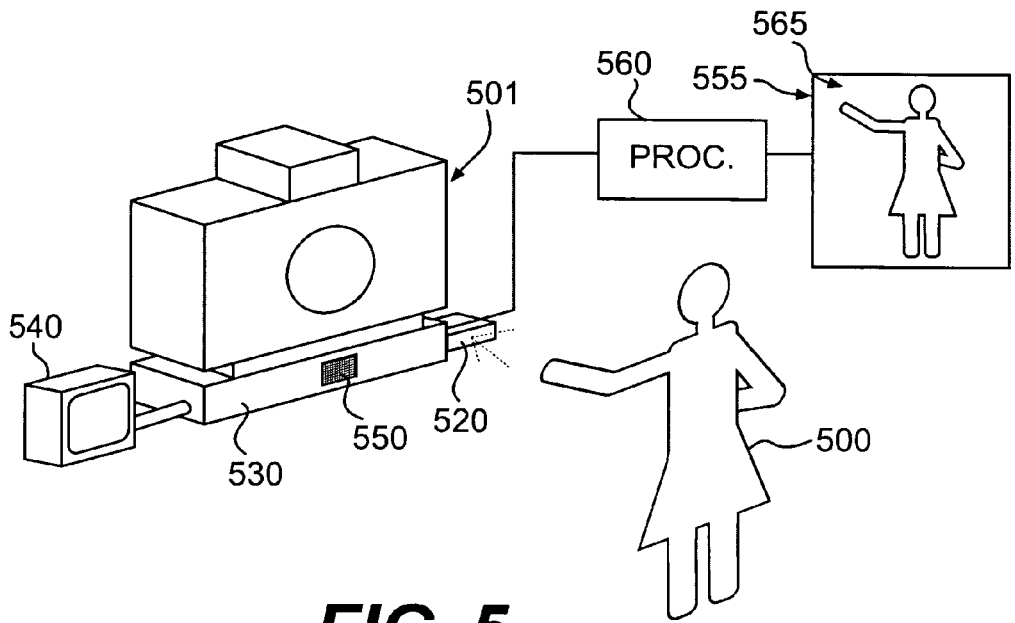
FIG. 5 illustrates a method to feed back data to a subject having his or her picture taken, in order that the subject assume another pose or engage in another activity.
Figure 6:
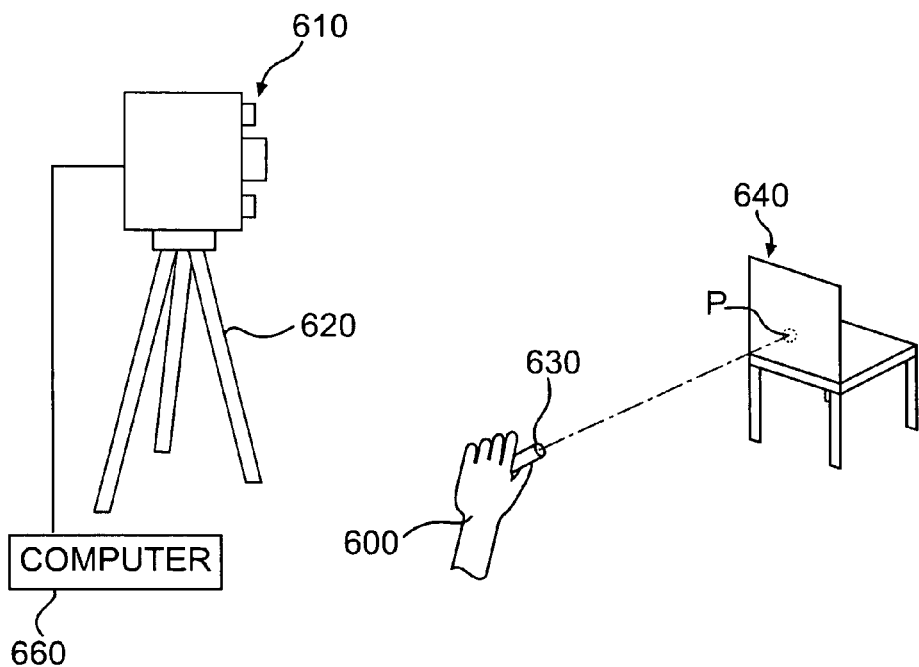
FIG. 6 illustrates a commercial version of the invention useful for police departments and real estate agents, among others.

FIG. 5 illustrates further one of many methods by which the invention may be used to feed back data to a subject (or subjects) having his or her picture taken, in order that the subject assume another pose or engage in another activity.

For example consider FIG. 5. A girl 500 is having her picture taken by the camera of the invention 501 (in this case a single digital camera version such as illustrated in FIG. 4), and her positions, orientations or sequences of same, including motions between points are analyzed as described above, in this case by computer 530. The computer has been programmed to look for funny movements and positions, defined here as when the arms are in unusual positions (clearly a subjective issue, programmed as to tolerances, or taught to the system by the person in control of the situation).

The girl then poses for the camera. When the camera of the invention takes the picture according to its preprogrammed criteria, (in this case, for example, defined as when her arms are over her head, and after a significant movement has occurred) it lets her know by lighting light 520 connected by wires not shown to computer 530. During the photo shoot, then she begins to learn what it is looking for (if she hasn't been already told) and does more of the same. If desired, and optional video display 540 or voice out put speaker 550, both connected to computer 530, indicate to her what is desired. This could also be a particular type of pose, e.g. "Cheesecake" based on historic classical poses learned from photo art. (note that she can also make comments for recording too, with optional microphone input not shown. As pointed out above, voice recognition software, such as IBM Via Voice" can be used to recognize commands from the subject or photographer, and cause other results).

It can be more sophisticated yet. For example, if the computer 530 and any associated software as needed may be used to analyze the models lips, and her smile. In this manner, the invention can be used to photograph all "smiling" poses for example. Or poses where the smile is within certain boundaries of lip curvature even. Similarly, the camera or cameras of the invention can be used, with suitable image analysis software to determine when the subjects eyes are open a certain amount, or facing the camera for example.

FIG. 3 above has alluded to possible use of the invention data processing to determine position and /or orientation data from recorded picture frames, after the picture is taken. A method for selecting from memory pictures obtained when certain pre programmed poses of objects sequences of poses, or relationships of objects are represented.

Selection can be according to criteria for example 1-7 above, but there are some differences. First if the data is taken normally from a single camera such as that of 202 above, 3D information is not available. This being the case, conventional 2D machine vision type image processing (e.g. "Vision Bloks" software from Integral Vision Corp.) can be used to extract object features and their locations in the images retained.

A second version alternatively could employ a single picture taking camera, but by employing 3 dot or other suitable targets on the photographed object in the camera field, could calculate 3D data related to the object (position and orientation in up to 6 axes can be so calculated by the computer of the invention using target location data in the camera image field)

A third version, records data from the camera, or in the case of the FIG. 2 device, all three cameras.—all recorded for example on digital media such that the processing can be done after the fact, just as it would have been live.

Another application can be to monitor the relative change in successive pictures as seen by one or more relatively low resolution cameras and when such change is minimal, cue the high resolution camera requiring a longer exposure to become enabled. In this manner blur of the high resolution camera image is avoided. This is useful in taking pictures of children, for example. This comparison of images can be made without actually measuring distances, but rather by looking for images which are not different with in an acceptance band, one to another, thus indicating the motion is largely stopped. This can be determined by subtracting one image from the other and determining the amount of pixels above a threshold. The more, the less the images are alike. Other techniques can be used as well, such as correlation techniques.

In some instances it is desirable to have, in taking pictures, a display such as 555, preferably (but not necessarily) life size. This display can be not only used to display the image 565 of the person whose picture is being taken, but as well can display still (or video) images called up from computer memory or other media storage such as DVD discs, and the like. One use of the displayed images is to indicate to the subject a desired pose for example. This can be done by itself, or interactively using the invention. A computer generated and rendered 3D image can also be created using suitable 3D solid modeling software (such as CAD KEY) to show an approximate pose to the model.

For example the invention disclosed above, allows one to automatically observe the expressions, gestures and continence of a person, by determining the shape of their smile, the direction of eye gaze, and the positions or motion of parts of the body such as the head, arms, hands, etc. Analysis using pre programmed algorithms or taught sequences can then lead to a determination as to what information to display on display 555 controlled in image content by display processor 560.

As one instance, suppose computer image analysis of data from camera 501 of the invention has determined that the person 500 is not smiling enough, and is in too stationary a pose. A signal from computer 510 is provided to display processor 560 so as to display on display 555 an image of someone (perhaps the same subject at an earlier time, or a computer generated likeness of a subject) having the characteristics desired. The person looks at this display, and sees someone smiling more for example, and in one scenario, tries to mimic the smile. And so forth. Alternatively, voice generation software, such as included in IBM VIAVOICE can be used to computer generate a voice command, "Smile More" for example, rather than show a visual illustration of the effect desired.

FIG. 6

Let us now discuss some other applications of picture taking enabled by the invention. One embodiment can be used to determine location of items in a scene, for example furniture in a house, for which homicide studies or insurance fraud could be an issue. (see also FIG. 1 above, as well as referenced co-pending applications).

For example, a detective (whose arm 600 is shown) arrives at a murder scene in a room, and he sets the stereo camera 610 of the invention disclosed in FIG. 2c on a tripod 620 (or other suitable location) and systematically designates, using laser pointer 630, any object desired, such as chair 640 impacted by the laser beam at point P. The camera/computer system of the invention locates the designated point takes a picture of the room, or a portion thereof, including the zone of the designated point P which stands out in the picture due to the laser spot brightness. Optionally, the stereo pair of cameras of the invention can digitize rapidly the xyz coordinates of point p, which can be superposed if desired on the image of the scene including point p itself and its immediate surroundings. This data can be processed by computer 660 as desired and either recorded or transmitted to a remote location along with the images as desired using known communication means. This work can be done outdoors, as well as inside. Numerous points to be digitized can be sensed and /or indicated, as desired.

The same digitization procedure can be used to digitize a room for a real estate person for example, to develop a data base on a house for sale. And many other such applications exist.

Finally it should be noted that the invention solves many famous problems of picture taking, for example of children. The digital camera images of the invention can be processed for example using appropriate software such as Vision Bloks to determine if the child's eyes are open (determined for example by recognizing the eye iris in the face area), and if so to take the picture, or after the fact, to select the picture from a group. Or a signal can be given by the system to the child to "open your eyes" so to speak. To determine if the eye is open, he image can be processed for example to look for the white of the eye, or to look for red reflections from the eye. This can even be done with deep red, or near IR light sources like LEDs which do not bother the child.

Similarly, if the child (or other subject) is in motion, when you want him still, the picture can be analyzed until he is still, and then the picture taken or selected. This can be determined from comparison of successive frames, from motion blur or other characteristics of motion in the image. Or a signal as above can be given to the child to "sit still" (a famous command in picture taking annals).

FIG. 7

The invention can also be used for commercial photography and for producing motion pictures. One advantage is that very high resolution images at suitable exposure levels of critical scenes can be taken, but not too many which would overload the memory capacity of a camera system. A means to enhance this is now described.

It is noted that a camera having an ability to read individual pixels as desired, or at least to choose the lines of pixels to be read, can achieve high rates of scan if one knows apriori where to look apriori for data. Or if one say scans every $20^{th}$ pixel in either direction xy of the camera, to determine where frame to frame changes are occurring. (due to change in pixel brightness or color). Once change is determined one can often isolate those areas to the ones of interest. For example, even in a "Still" picture, the head often moves (similar to the lovers on the bench in the shopping mall mentioned above). Every $20^{th}$ pixel, cuts the number of pixels by 400 times, and raises a normal 30 hz scan rate to over 1000 scans per second—more than needed in many cases.

When the area of interest is found, the pixels in that area are all scanned for example.

Such pixel addressing cameras can also be used for determining the position and change in position of features used to determine, and track, pose and other variables, as has also been discussed in co-pending applications, particularly Camera Based Man-Machine Interfaces U.S. Ser. No. 60/142,777, incorporated herein by reference. Of special interest is that same high resolution camera can be used to take the picture desired, while at the same time be used to find or track the object at high speed.

Such high speed tracking can be interspersed with the taking of pictures. For example if in photographing a ballet, it may be desired only to take pictures of the prima ballerina, who typically is the one, with any male dancer, that is moving the most. By determining the zone to be measured, one can sense quickly what zone should looked at, and high resolution photographs obtained from that zone. This allows one to use a very large format camera in a fixed location (e.g. 5000×5000 pixels) to cover the image of the whole stage via suitable optics, but to only take and store the pixels in a 1000×700 zone of interest movement, or positional or gesture interest for example, providing a 35 times increase in the frame rate needed today with such large pixel cameras. This allows their practical use, without resort to human cameramen, or pan/tilt mechanisms.

Similar logic holds for quarterbacks in a football game, who often run faster than any defense men around them and can be differentiated accordingly (along with any other issues such as uniform color, design or the like). If possible, it is desirable to have a clearly defined target, such as a retroreflective or bright colored target on ones helmet for example. Indeed helmet color can be chosen accordingly.

Figure 7:
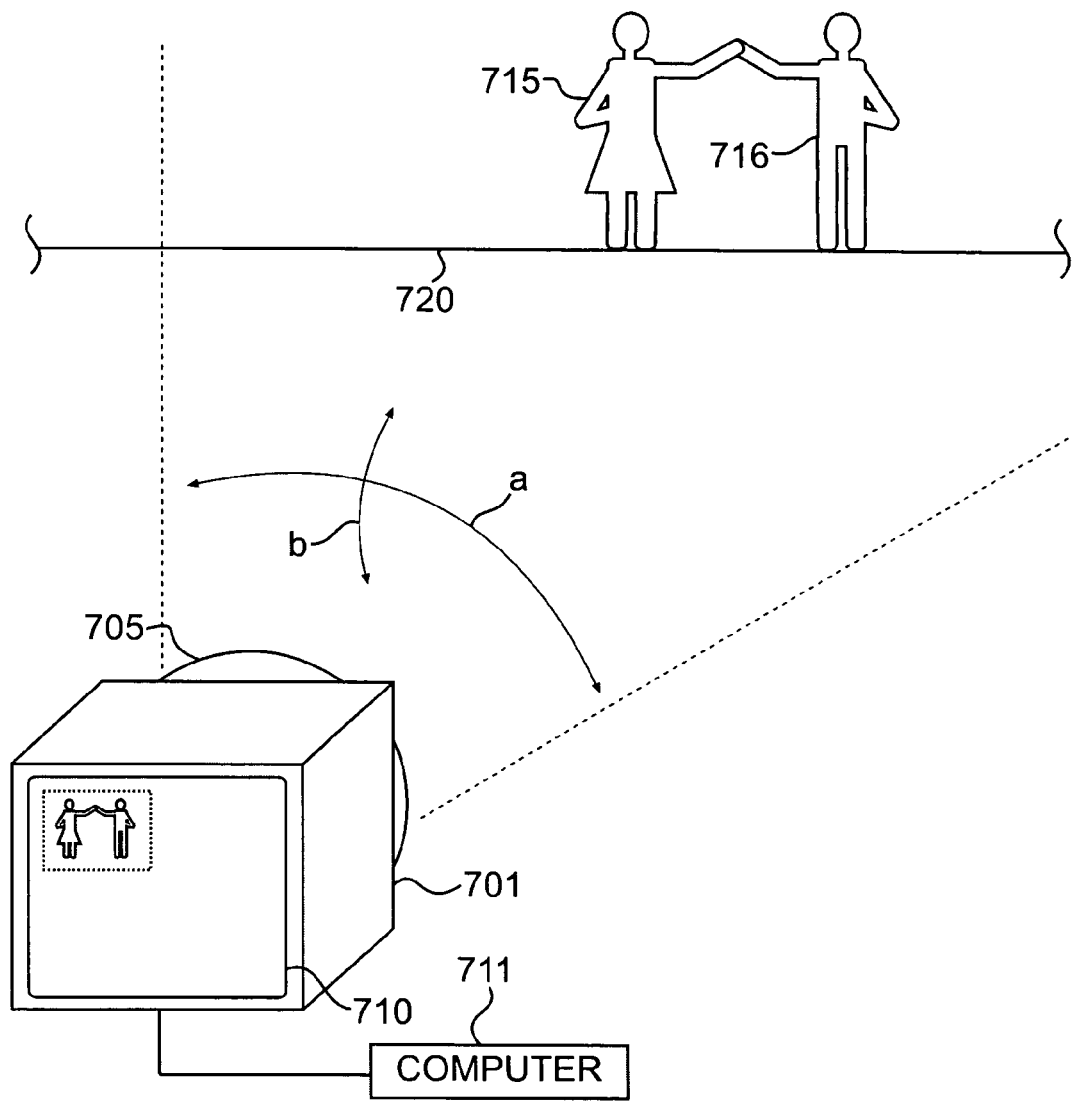
FIG. 7 illustrates an embodiment of the invention used for photography of stage performances.

This is illustrated in FIG. 7 wherein camera 701 composed of lens 705 and an addressable version of a Kodak MegaPixel detector array 710 having 4000×4000 elements and under the control of computer 711 is used to scan the image of a pair of dancers 715 and 716 on stage 720. The field of view of the camera equal to area ab covers the whole stage. But the area scanned out from array 710 is confined to the region in which the dancers were last seen, which is defined as a zone a'b' equal to in this case 500×500 pixels. This still allows DVD type resolutions to be achieved, without pan or tilt of the camera. Similarly such techniques can be used for video conferencing, sports, and other activities as well.

It should be noted that in the above embodiments the words picture and photograph are interchangeable, as are photographing or photography and picture-taking. The camera used for same is preferably but not necessarily a solid state TV camera whose pixels are scanned serially or randomly under program command.

FIG. 8

The invention can also be used to sense positions of people for instructional purposes. Data as to a dancers movements for example can be obtained, and appropriate images, or data or both transmitted without excessive bandwidth requirements to a remote location for comment or interaction by a trained professional. Combined with life-size screen displays this allows a life like training experience to be gained at low cost, since one professional can watch 10 students in different locations say, each trying her movements alone in the intervening moments. In addition such training can occur in the home, as if one had a private tutor or coach.

Figure 8:
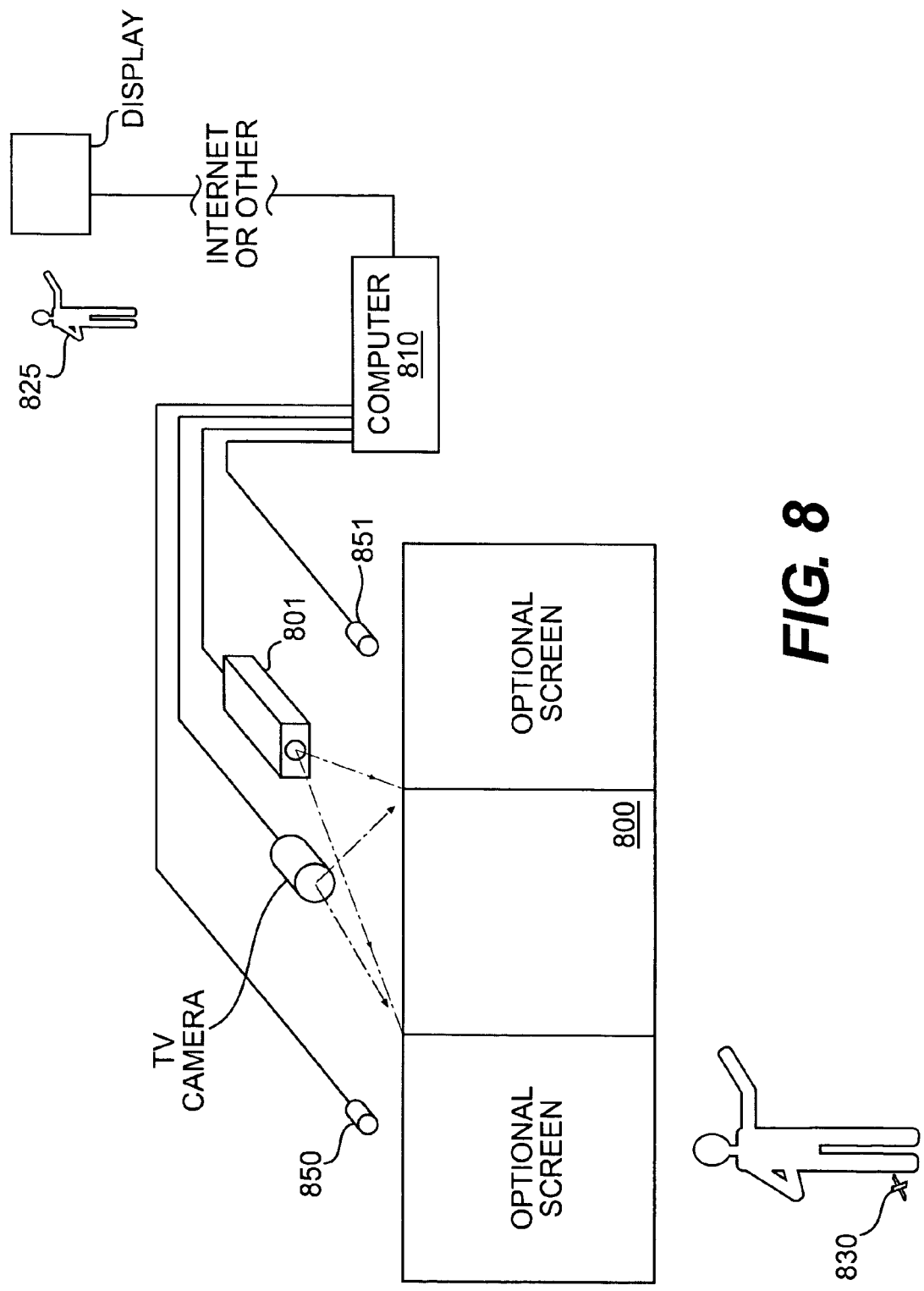
FIG. 8 illustrates an embodiment of the invention used for ballet instruction and other teaching and interaction activities also with remotely located instructors or players.

For example consider FIG. 8. A class of ballet students is practicing near a "mirror" which in this case is comprised life size digital display screen 800 illuminated from the rear by a Sharp brand projector 801 driven by computer 810. By sliding a real mirror in an out the mirror can be a mirror, or a display. If desired, this display can be extensive, and for example using 3 projectors to cover 3 adjacent screens each s 6 feet high ×9 feet long for example, such that a total length of a large studio is comprised.

A master instructor 825 (possibly remotely located via the internet or other communication means) can observe the students via TV camera (or cameras). By viewing the students the instructor can make corrections via audio, or by calling up imagery which represents the appropriate moves—for example from a professional doing the same Swan Lake number. In addition, the TV cameras of the invention can monitor the actual location and movements of the student, or students, and their relationship to each other, and if desired to various markers such as 830 on the floor of the studio, placed there to assist in choreographing the piece.

In addition, if the various gesture and position monitoring aspects of the invention are utilized as described above and in co-pending applications it is possible to have the instructions computer generated using dancers movements as input to a computer analysis program. This is particularly useful if dance routines which are classical in nature, are being attempted, which have known best forms which can be computer modeled.

In another version, an assistant can be on the scene say working with ten students in a local studio, while the master is remote.

It is also possible with the invention to provide input image data to projector computer 810, even from remote internet located sources, which represents other people dancing for example. These can be images of the master, or others in the class—even if all in different locations. OR the images can be those of others who have performed a particular routine in the past, for example Dance of the Sugar plum fairy in the Nutcracker. This imagery could be from the Bolshoi ballet performance of the same dance, displayed in small town ballet studio or home—to illustrate the moves required. The use of life size projection not only gives a feel to this imagery, but further allows I have discovered, a unique experience for the performer. Namely that the person can perform "with" the troupe displayed. In some cases, in ballet for example, this sometimes can be more useful than watching ones self in the mirror (typical in ballet studios).

By using the cameras of the invention, such as stereo pair 850 and 851 to determine student positions, it is also possible to control the display in many ways. For example as the student got closer to the display, the persons in the display, could appear to come closer to the student. Conversely, it might be desirable to have them move away from the student to keep a constant apparent distance between them for example. And if the student is twirling left, the figures in the ballet depicted on the screen, can be caused to turn right (as they are "in the mirror" so to speak) to match the movement of the student in approximate form at least.

In addition it is often desirable for learning purposes to Control speed of music and video display to match sensed movements of pupil, or from remote master person. Use display techniques which can produce variable motion display, such as variable speed DVD disc or read data in to ram. In addition it is desirable that overlaid could be masters voice.

The invention can be advantageously used in many performing arts, not just ballet. For example, live theatre, where actors from Hamlet performances of the past can interact with those practicing. Or where instructors of Skating or Gymnastics, other activities can also interact.

Sports as well is amenable to the technique, but the size of the "studio" or gym becomes an issue. Basketball for example fits the space aspect of the projection screens and the fields of view of the invention cameras as here described.

Ability of masters remotely located, and use of copyrighted performance material of famous performers and troupes allows one to franchise the studio concept of the invention. For example each town could have a Bolshoi studio franchise of this type.

It is noted that this same arrangement can serve other purposes beyond instruction. One is the possibility of remote dating, in which sensed movement of one partner is communicated, along with voice and visual expression to the other. In addition, is possible, as disclosed in co-pending applications, to build the displays described above in the form of a touch screen in which contact of one partner with the display of the other remotely transmitted from afar can occur.

If one uses large scale touch screens with optional added sensor inputs. As would be the ballet studio example of FIG. 8 if equipped with touch screen capability, then one can provide a mechanism for marketing of people relative (i.e. life size) objects such as automobiles in facilities such as Auto showrooms. Thus a ballet studio for example, can be used for other purposes, not just instructional, but for selling cars for example, where the display screen is displaying new models, (including ones that are figments of design imagination, and where customer input is desired as in a focus group) and where customer inputs voice and action can be detected if desired by the invention. Or in reverse, a underused car showroom can be converted—on demand—into a site which can be used for, among other things, instructional purposes in performing arts, sports and the like. This gives a reason for being to the show room that transcends selling cars, and helps attract people to the facility. If a car was displayed, on a touch screen, one could walk up to the full size display of the car, and touch the door handle, which would cause the touch screen to sense that same had occurred, and indicate to the computer to cause the display to display the door opening to expose the interior.

What is claimed is:

1. A method for photographing a person, comprising the steps of:
    providing at least one digital camera, a computer, and an image processing software,
    positioning said camera to view said person including a face of the person and thus so that the camera is positioned separate from said person,
    acquiring an image of said person with said at least one digital camera,
    processing of said image with the computer,
    determining from said processed image a state of said person,
    comparing with the computer said state of said person to a desired state, and
    recording by the computer, if the result of said comparison is that said state of said person is the desired state, of the image so as to be viewable later as a photograph.

2. A method according to claim 1, wherein said desired state is a pre-determined expression.

3. A method according to claim 2, wherein said pre-determined expression is a smile.

4. A method according to claim 2, wherein said pre-determined expression is to have eyes of said person open.

5. A method according to claim 2, wherein said pre-determined expression is to have eyes of said person gazing in a pre-determined direction.

6. A method according to claim 1, wherein said desired state is a pre-determined pose.

7. A method according to claim 1, wherein said desired state includes having a body part in a pre-determined location.

8. A method according to claim 7, wherein said body part is a face.

9. A method according to claim 1, including the further step of determining a succession of states of said person before taking said photograph.

10. A method according to claim 1, including the further step of providing an instruction relating to a result of said comparing step.

11. A method according to claim 10, wherein said instruction is a signal to the person.

12. A method according to claim 10 wherein said instruction is a display for use by the person.

13. A method according to claim 1, wherein said desired state is taught to the computer.

14. A method according to claim 1, wherein the state of the person is a gesture of the person and the desired state of the person is a desired gesture of the person.

15. A method according to claim 14, wherein said gesture is a movement of a hand or a head of the person.

16. A method according to claim 14, wherein said gesture is the placing of a body part of the person in a pre-determined position in space.

17. A method according to claim 14, wherein said gesture is the placing of a body part of the person in a pre-determined position relative to other body parts of the person.

18. A method according to claim 14, wherein a sequence of photographs are taken.

19. A method according to claim 1 including the further step of determining the relationship of said person with respect to another person or object.

20. A method according to claim 1 wherein the desired state of said person is to be sufficiently still.

21. A method according to claim 1 wherein a signal is provided to said person as a result of said state determination.

22. A method according to claim 1 wherein a displayed image of a desired state is provided to said person.

23. A method according to claim 1 further including the further step of determining the degree of the state of said person and using the said degree thereof in making a comparison with a desired state.

* * * * *